March 7, 1950     M. A. ROTHENBERGER     2,499,781
EXPANDING ARBOR
Filed April 24, 1948
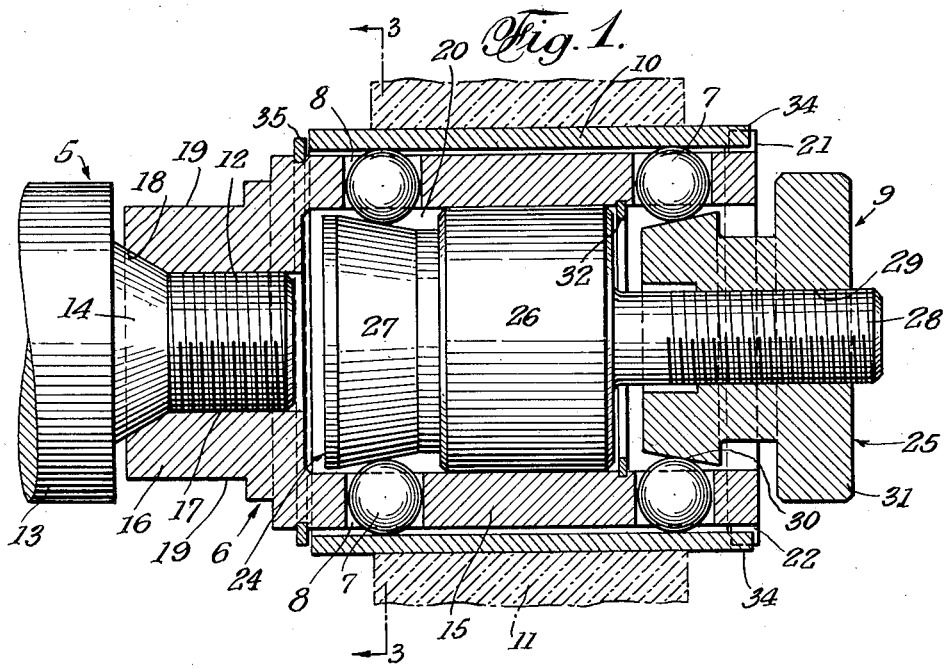
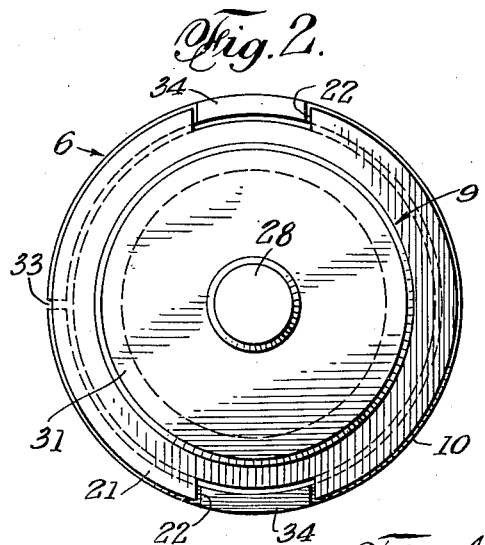
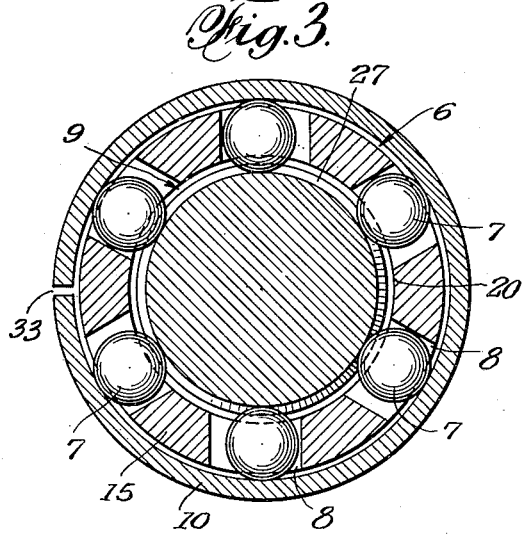
Inventor
MELVIN A. ROTHENBERGER
By C. G. Stratton
Attorney

UNITED STATES PATENT OFFICE 2,499,781

EXPANDING ARBOR

Melvin A. Rothenberger, Los Angeles, Calif.

Application April 24, 1948, Serial No. 23,022

10 Claims. (Cl. 279—2)

This invention relates to arbors or mandrels and deals more particularly with a device of this nature that is adapted for the quick and accurate mounting of a piece of work in a lathe or other machine tool.

An object of the present invention is to provide an expanding arbor that acts in the manner of a collet chuck to effect quick and accurate mounting of a work piece thereon.

Another object of the invention is to provide an expanding arbor that embodies a split work piece-mounting sleeve that is expanded by novel and accurate means to grip a work piece.

Another object of the invention is to provide an arbor as above in which the sleeve expanding means are applied to effect uniformity of force to the sleeve whereby the same is expanded uniformly throughout its length and diameter.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a longitudinal sectional view of an expanding arbor embodying features of the present invention.

Fig. 2 is an end elevational view thereof as seen from the right of Fig. 1.

Fig. 3 is a cross-sectional view as taken on line 3—3 Fig. 1.

Fig. 4 is a fragmentary detail view of one of the sleeve expanding elements and showing the nature of the seat provided therefor.

The present arbor is adapted to be removably mounted on an extension 5 of a lathe chuck or any similar extension of a lathe or other machine tool. The expanding arbor that is illustrated comprises, generally, a body 6, a plurality of elements such as bearing balls 7 arranged in radially arranged seats 8 formed in said body, manually operable wedge means 9 within the body for controlling the position, with relation to the axial center of the body, of the elements 7, and an expanding sleeve 10 on the body and engaged by said elements to expand into the bore of a work piece 11.

The extension 5 comprises a threaded stud 12 that projects from a chuck or other similar spindle part 13, and a conical intermediate portion 14 between stub 12 and part 13. In practice, that stud should be accurately concentric wtih the axis of part 13.

The body 6 is formed with a tubular outwardly projecting portion 15 and a hub part 16 that has an internal thread 17 for stud 12 and a conical seat 18 for conical portion 14. The latter insures concentric mounting of the body on spindle part 13. The hub part 16 is provided with opposed flats 19 for a tool that facilitates mounting or dismounting of the body on the spindle.

The tubular portion 15 of the body is machined with an axial bore 20 that is accurately centered on the axis of the body and, in practice, is ground to a close tolerance sliding fit with the wedge means 9. The outer end of portion 15 is provided with an outwardly directed flange 21 that is smaller in diameter than the outer diameter of sleeve 10 and is provided as with opposed notches 22 that serve to receive portions of said sleeve and thereby hold the same non-rotationally on the body.

The tubular portion 15 of the body is provided with two spaced sets of seats 8 for the bearing balls 7. In this instance each seat comprises a through hold that is slightly oversize of the balls, so that each ball has a two-point contact with its seat, the latter, as best seen in Fig. 4 is formed with V-shaped walls 23 that engage the ball when the same is urged by right hand rotation of the wedge means 9. The corner defined by walls 23 permits passage of dust particles and insures firm seating of said balls.

It will be noted that the wall of tubular portion 15 is thinner than the diameter of the balls so that the latter project both into bore 20 and outward of the outer surface of portion 15.

The wedge means 9 comprise relatively axially adjustable elements 24 and 25. The former is provided with an intermediate cylindrical part 26 that has a close tolerance fit in bore 20, a conical wedge part 27 on one end of part 26 for engagement with one set of balls 7 when element 24 is moved in an outward direction, and a threaded shank 28 on the other end of part 26. The element 25 has an internally threaded axial bore 29 for shank 28, is provided with a conical wedge part that is oppositely angled to wedge part 27 for engagement with the other set of balls 7 when moved in an inward direction, and has a knurled knob part 31. It will be evident that, upon manual manipulation of knob part 31, the conical wedges 27 and 30 may be moved toward each other to effect outward projection of the balls 7 of both sets thereof, or away from each other to allow said balls to retract into the bore 20 of the body. While not essential, the wedge parts are formed with similar, although opposite angles.

To insure retention of wedge means 9 with the body, a snap ring 32 or the like is provided in the wall of bore 20 to overstand the part 26 and prevent the same from moving too far in an endwise direction. A limited amount of movement for element 24 is provided, however.

The sleeve 10 is formed with a longitudinal slit 33 that is normally closed and, in that condition, will freely slip over the body. Since it is not desirable to have the slit 33 become aligned with any of the balls 7, said sleeve is keyed against rotation by extensions 34 that enter loosely in notches 22 of the body. A snap ring 35 on the body retains said sleeve in assembly with the body.

The arbor is assembled by holding sleeve 10 upright with the extensions 34 up; dropping the body, hub first, into the sleeve after the wedge means 9 has been placed therein with the conical parts 27 and 30 spread quite far apart; then, before the first set of seats 8 are covered by the sleeve, inserting a set of balls into said seat; then inserting the second set of balls and completely telescoping sleeve and body by entering extensions 34 into notches 22; and finally applying snap ring 35. The sleeve 10 will be rotatable and have some end play as will the wedge means 9.

In operation, the expanding arbor above provided, is mounted on spindle 13, the work piece 11 is slipped over the contracted sleeve 10 and then, by rotating element 25, the wedge parts 27 and 30 are moved toward each other, engage balls 7, and project the same outwardly to cause sleeve 10 to be expanded into firm gripping engagement with the work piece 11. It will be seen that all of the balls exert the same force on the sleeve to lock the same to the body; that the sleeve will be concentric with part 26 and, therefore, with the body; and that the operation is quick and effective. Reverse rotation of element 25 will readily release the force of the balls, allow the sleeve to contract and free the work piece for removal from the arbor.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. An expanding arbor comprising a tubular body having an axial bore and radially arranged seats extending through the body from the bore to the outer face of the body, a ball in each seat, a longitudinally split sleeve telescopically engaged over the body, and wedge means within the bore for engaging said balls to force them into expanding engagement with the sleeve.

2. An expanding arbor comprising a tubular body having an axial bore and radially arranged seats extending through the body from the bore to the outer face of the body, a ball in each seat, a longitudinally split sleeve telescopically engaged over the body, and wedge means within the bore for engaging said balls to force them into expanding engagement with the sleeve, said wedge means comprising an element slidingly fitting said bore and having a conical part for engagement with some of said balls, and an element adjustably connected with the first element and having a conical part for engagement with the remainder of said balls.

3. An expanding arbor comprising a tubular body having an axial bore and radially arranged seats extending through the body from the bore to the outer face of the body, a ball in each seat, a longitudinally split sleeve telescopically engaged over the body, and wedge means within the bore for engaging said balls to force them into expanding engagement with the sleeve, said wedge means comprising an element slidingly fitting said bore and having a conical part for engagement with some of said balls a threaded shank on said element, and a second element threadedly engaged with said shank and having a conical part for engagement with the remainder of the balls.

4. An expanding arbor comprising a tubular body having an axial bore and radially arranged seats extending through the body from the bore to the outer face of the body, a ball in each seat, a longitudinally split sleeve telescopically engaged over the body, and wedge means within the bore for engaging said balls to force them into expanding engagement with the sleeve, said wedge means comprising an element slidingly fitting said bore and having a conical part for engagement with some of said balls a threaded shank on said element, and a second element threadedly engaged with said shank and having a conical part for engagement with the remainder of the balls. said latter conical part being oppositely angled with respect to the first mentioned conical part.

5. An expanding arbor comprising a tubular body having an axial bore and radially arranged seats extending through the body from the bore to the outer face of the body, said seats being arranged in two spaced groups along the longitudinal dimension of the body, a ball in each seat, a longitudinally split sleeve telescopically engaged over the body, and wedge means within the bore for engaging said balls to force them into expanding engagement with the sleeve.

6. In an expanding arbor having a plurality of balls and a work piece-mounting sleeve, means for projecting said balls to expand said sleeve comprising relatively axially adjustable interengaged elements each having a conical wedge for engaging said balls.

7. In an expanding arbor having a plurality of balls and a work piece-mounting sleeve, means for projecting said balls to expand said sleeve comprising relatively axially adjustable inter-engaged elements each having a conical wedge for engaging said balls, said wedges being oppositely angled whereby relative movement of the same in one direction projects the balls and relative movement in the opposite direction releases said balls for retraction.

8. An expanding arbor comprising a tubular body having an axial bore and radially arranged seats extending through the body from the bore to the outer face of the body, a ball in each seat, a longitudinally split sleeve telescopically engaged over the body, means inter-engaging the body and sleeve to hold the same against relative rotation, and wedge means within the bore for engaging said balls to force them into expanding engagement with the sleeve.

9. An expanding arbor comprising a tubular body having an axial bore and having a notch at the end of the body and radially arranged seats extending through the body from the bore to the outer face of the body, a ball in each seat, a longitudinally split sleeve telescopically engaged over the body, means comprising an extention on the sleeve fitting into the notch at the end of the body for inter-engaging the body and sleeve to hold the same against relative rotation, and wedge means within the bore for engaging said balls to force them into expanding engagement with the sleeve.

10. In an expanding arbor, a tubular member having seats therein, a ball in each seat, means internally of said member for projecting said balls outwardly, and an expanding sleeve telescopically engaging over the tubular member and engaged by said balls, said internal means being rotative during operation to project the balls and said seats, each being formed with a V-shaped wall on that side thereof that receives the thrust of the ball during said rotative operation to provide two points of engagement for the ball and also define a V-shaped space through which foreign matter is dislodged from the seat.

MELVIN A. ROTHENBERGER.

REFERENCES CITED

The following references are of record in the file of this patent:

UNITED STATES PATENTS

| Number | Name | Date |
| --- | --- | --- |
| 1,468,270 | Kent | Sept. 18, 1923 |
| 1,930,669 | Varcoe et al. | Feb. 2, 1931 |
| 2,431,961 | Phillips et al. | Dec. 2, 1947 |

FOREIGN PATENTS

| Number | Country | Date |
| --- | --- | --- |
| 128,191 | Great Britain | Feb. 11, 1919 |